United States Patent [19]

Sun

[11] Patent Number: 4,524,180

[45] Date of Patent: Jun. 18, 1985

[54] RUBBER-MODIFIED, IMPACT-RESISTANT POLYMERIC COMPOSITIONS

[75] Inventor: Yun C. Sun, Midland, Mich.

[73] Assignee: The Dow Chemical Company, Midland, Mich.

[21] Appl. No.: 380,594

[22] Filed: May 21, 1982

[51] Int. Cl.³ .................... C08L 25/06; C08L 53/02; C08L 51/04

[52] U.S. Cl. ........................................ 525/71; 525/99

[58] Field of Search ................... 525/99, 71

[56] References Cited

U.S. PATENT DOCUMENTS

| 3,352,944 | 11/1967 | Wheat | 525/99 |
| 3,509,237 | 4/1970 | Aubrey | 525/71 |
| 3,536,784 | 10/1970 | Skendrovich et al. | 525/99 |
| 4,233,409 | 11/1980 | Bulkley | 525/71 |
| 4,294,937 | 10/1981 | Whitehead | 525/99 |
| 4,315,083 | 2/1982 | Burk | 525/99 |

FOREIGN PATENT DOCUMENTS

| 910533 | 9/1972 | Canada | 525/99 |
| 0048389 | 3/1982 | European Pat. Off. | 525/71 |
| 0052732 | 6/1982 | European Pat. Off. | |
| 54-003148 | 1/1979 | Japan | 525/99 |

Primary Examiner—Wilbert J. Briggs, Sr.
Attorney, Agent, or Firm—Jonathan W. Morse; Thomas J. Mielke

[57] ABSTRACT

Improved combinations of gloss and toughness are obtained in rubber-modified, impact-resistant monovinylidene aromatic polymer compositions when mass-produced particles consisting of a blend of polybutadiene with a block copolymer rubber are dispersed therein. Advantageously, the rubber-modified polymer compositions also comprise one or more groups of emulsion-produced rubber particles.

6 Claims, No Drawings

RUBBER-MODIFIED, IMPACT-RESISTANT POLYMERIC COMPOSITIONS

BACKGROUND OF THE INVENTION

It is well known in the art that various relatively rigid and/or brittle polymers of monovinylidene aromatic monomers can be made more impact resistant by the inclusion of amounts of various types of elastomeric materials (rubbers) into a matrix or continuous phase of said brittle polymer. Usually the elastomeric materials are in the form of discrete particles, such particles having amounts of the matrix polymer or a polymer similar thereto graft polymerized to particles. These types of rubber-modified, impact-resistant polymeric compositions are commonly known and referred to as graft copolymers or polyblends. Among the best known of these types of compositions are high impact polystyrene (HIPS), poly(styrene-acrylonitrile) reinforced with a butadiene-containing elastomer (ABS), and compositions similar to these.

It is also well known in the art that the physical properties of these types of compositions are greatly affected by the relative amounts of elastomer particles having different sizes and structures. Larger rubber particles having diameters greater than about 0.5 micron contribute greatly to impact resistance, but tend to reduce the gloss of articles formed or molded from compositions containing them. On the other hand, when smaller modifying-rubber particles are used in polymer compositions, articles formed therefrom tend to be glossier, but are less impact resistant than if the same amount of larger-particle rubber was used.

Furthermore, concerning the structures of the individual rubber particles (i.e., rubber particle morphology), there are well-known advantages and disadvantages accompanying the use of either of the two main rubber particle types in rubber-modified polymer compositions. It is generally believed that the grafted rubber particles containing occlusions of matrix polymers therein, one of the two main particle types, provide more impact resistance than the same amount of rubber in the form of similarly grafted solid rubber particles, the other main particle type. Such grafted, occlusion-containing rubber particles are usually formed and grafted in a mass-type or mass-suspension-type polymerization process where a previously-produced rubber is dissolved in a solution comprising one or more polymerizable monomer(s), which monomers are thereafter polymerized. Occlusion-containing particles produced in such mass or mass-suspension types of processes or variations of these processes are hereinafter referred to as "mass particles".

It is also well known in the art that mass particles present in rubber-modified polymeric compositions can have a very detrimental effect on the gloss of articles formed therefrom. In spite of the disadvantages of mass particles, however, they are a very desirable constituent of rubber-modified polymer compositions. One basis for their desirability is that, probably due to their occluded structure, they provide a great deal of impact resistance for the amount of rubber which is actually present. Other desirable facets of including mass particles in rubber-modified polymer compositions include the ability to utilize a wide variety of rubber compositions and types and the economy and efficiency of the mass-type processes by which they are formed.

Solid or non-occluded rubber particles, the other main type of rubber particle, are usually achieved via emulsion polymerization of the rubber in aqueous latex. After the rubber is made, polymerizable, graftable monomers (e.g., styrene and/or acrylonitrile) are usually added to the rubber-containing latex and polymerized to form the graft portion as well as amounts of matrix polymer. These non-occluded type rubber particles, produced via emulsion polymerization are hereinafter referred to as "emulsion particles". Under most circumstances, however, emulsion polymerization techniques are generally economically feasible for the production of rubber particles having diameters less than about 0.25 microns or so.

As is also generally known in the art, there are many individual characteristics of rubber particles, given a desired size and particle structure, which can be conveniently and separately controlled to optimize certain properties of the rubber-modified polymer compositions to which they are added. Some parameters which are subject to quite wide variation to affect the physical properties of the resultant compositions include the molecular weight of the mass rubber, the degree to which either mass or emulsion rubber is cross-linked, the amounts and types of different polymers which are grafted to the particles. The use of higher molecular weight rubbers in the mass particles produce rubber-modified polymer compositions which are tougher but have poorer gloss. In general, the physical properties of rubber-modified polymer compositions are optimized at intermediate crosslink densities and graft-to-substrate ratios, the extremes in either of these properties affecting most properties of the resultant compositions undesirably. Since the above-described rubber characteristics are easily controlled in the mass rubber particles, this is another incentive for their use.

As is obvious from the above discussion, and well known in the art, emulsion polymerization techniques are well-suited for preparation of small rubber particles, while mass-type processes or agglomeration of smaller emulsion particles can be used to achieve large particle sizes.

In view of these phenomena observed in production of rubber-modified polymer compositions, a great deal of effort has gone into achieving optimized physical properties by tailoring the rubber particle distribution (i.e., sizes and types of rubber particles and the amounts of different size and/or types rubber particles) in polymeric compositions. See, for example, U.S. Pat. Nos. 3,509,237; 3,576,910; 3,652,721; 3,663,656; 3,825,621; 3,903,199; 3,903,200; 3,928,494; 3,928,495; 3,931,356; 4,009,226; 4,009,227; 4,017,559; 4,224,414; 4,233,409; 4,250,271; 4,277,574, wherein various "bimodal" rubber particle distributions in ABS polymer compositions are disclosed.

The teachings of these patents can be broadly characterized as teaching that gloss and impact resistance can be affected by the sizes and types of rubber particles included in rubber-modified polymer compositions. Most of them teach that a substantial percentage of the particulate rubber must be of the small, emulsion-produced particle type to yield satisfactory, glossy, impact-resistant polymer compositions.

OBJECTS OF THE INVENTION

In view of the prior art which teaches that the larger mass-produced rubber particles tend to reduce the gloss of rubber-modified polymer compositions containing them, it would be desirable if there were available rubber compositions which, when incorporated into rubber-modified polymer compositions in the form of mass particles, produced compositions having good combination of toughness and gloss. It is an object of this invention to provide rubber compositions which can be used to provide mass particles in rubber-modified polymer compositions, which rubber-modified polymer compositions will have good combinations of toughness and gloss. It is also an object of the present invention to provide rubber-modified polymer compositions comprising mass particles consisting of improved rubber compositions, which rubber-modified polymer compositions have good combinations of toughness gloss. It is also an object of the present invention to provide a process for producing rubber-modified polymer compositions comprising mass particles of improved rubber compositions, which rubber-modified polymer compositions have good combinations of toughness and gloss. It is also an object of the present invention to provide rubber-modified polymer compositions comprising, along with mass particles of improved rubber compositions, emulsion rubber particles, preferably two differently sized groups of emulsion rubber particles.

SUMMARY OF THE INVENTION

These objects and other advantages are achieved in an improved rubber-modified, impact-resistant monovinylidene aromatic polymer composition having dispersed therein from about 1 to about 40 weight percent based on weight polymer composition of an improved rubber composition. This improved rubber composition consists of a blend of from about 20 to about 95 weight percent based on weight improved rubber composition of polybutadiene; and from about 5 to about 80 weight percent based on weight improved rubber composition of block copolymer of polybutadiene with a monovinylidene aromatic monomer and/or an ethylenically unsaturated nitrile monomer. Preferably the improved rubber blend composition is in the form of discrete particles having occluded therein and grafted thereto amounts of monovinylidene aromatic polymer. In other words, the improved rubber blend composition is preferably in the form of mass particles.

Rubber-modified, impact-resistant polymer compositions such as these are advantageously produced via a process wherein said polybutadiene and said block copolymer are both dissolved in a solution, preferably comprising one or more polymerizable monovinylidene aromatic monomer(s), then proceeding to mass polymerize monovinylidene aromatic polymer in the presence of the blended polybutadiene and block copolymer.

In another aspect, the present invention is an improved rubber blend composition consisting of a solution blend of:

(a) from about 10 to about 95 weight percent based on weight rubber blend of polybutadiene; and (b) from about 5 to about 90 weight percent of a block copolymer of butadiene with monovinylidene aromatic monomer and/or ethylenically unsaturated nitrile monomer; which rubber blend, when in the form of particles having occluded therein and grafted thereto amounts of monovinylidene aromatic polymer, said particles being dispersed in monovinylidene aromatic polymer, provides rubber-modified monovinylidene aromatic polymer compositions having better combinations of toughness and gloss than similar rubber-modified compositions utilizing as the rubber either one of the blend components alone.

DETAILED DESCRIPTION OF THE INVENTION

Rubber-modified polymer compositions according to the present invention comprise three essential elements:

(a) the matrix or continuous phase polymer, (b) the grafted or superstrate polymer, graft polymerized onto rubber particles and (c) the particles of the improved rubber blend composition, dispersed in said matrix polymer and to which are grafted the superstrate polymer. It should be noted that as used herein the terms "polymer" and "polymerization" are generic, and include either or both of the more specific cases of "homo- and inter-polymers" and "homo- and interpolymerization", respectively.

Preferably the particles of improved rubber blend composition also contain occluded therein amounts of the same monovinylidene aromatic polymer which is grafted thereto. Generally this polymer becomes occluded in the particle at the time the superstrate is being grafted onto the rubber dissolved in the solution comprising the polymerizable monovinylidene aromatic monomer through the well known phenomenon of phase inversion.

The monovinylidene aromatic polymer of the present invention present as both (a) matrix (continuous phase) polymer and (b) polymer grafted to and/or occluded within rubber particles comprises at least about 50 percent by weight, preferably at least 60 percent by weight, most preferably from about 65 to about 95 percent by weight of polymerized monovinylidene aromatic hydrocarbon monomer. As will be readily appreciated, the graft and matrix polymer can have the same or different compositions as long as they are compatible. For the purposes of the present invention, different matrix and graft polymers are considered compatible if a blend of the graft polymer with the matrix polymer would displace the glass transition temperature (Tg) of the matrix polymer. Preferentially, a blend of a graft interpolymer with a compatible matrix polymer exhibits a single Tg. The Tg of a composition is advantageously measured using a differential scanning calorimeter.

Exemplary of the monovinylidene aromatic hydrocarbons which may be polymerized in the matrix and graft polymers are styrene; alpha-alkyl monovinylidene aromatic compounds (e.g., alpha-methyl styrene, alpha-ethyl styrene, etc.); ring-substituted alkyl styrenes (e.g., ortho-, meta-, and/or para-vinyl toluenes, ortho-ethylstyrene, etc.); ring-substituted halostyrenes (e.g., ortho-chlorostyrene, para-chlorostyrene, ortho-bromostyrene, etc.); ring-alkyl, ring-halosubstituted styrenes (e.g., 2-chloro-5-methylstyrene, etc.); vinylnaphthalene; vinylanthracene, etc.). The alkyl substituents generally have 1 to 4 carbon atoms and may include isopropyl and isobutyl groups. If so desired, mixtures of such monovinylidene aromatic monomers may be employed.

Exemplary of the unsaturated nitriles which may advantageously by interpolymerized with the monovinylidene aromatic monomers and the resultant interpolymers used as matrix and/or graft polymer and/or otherwise included in the present invention are acrylonitrile, methacrylonitrile, ethacrylonitrile, and mixtures thereof. When present in an interpolymer with monovinylidene aromatic monomer, the unsaturated nitrile is generally employed in an amount of from about 5 to about 50, preferably from about 15 to about 35 weight percent based on the total weight of the polymerized monovinylidene aromatic and unsaturated nitrile monomers employed in preparing the graft or matrix polymers of the present rubber-reinforced products.

In addition to monovinylidene aromatic monomers and optional ethylenically unsaturated nitrile monomers, various additional monomers may be desirably included, in polymerized form, in the rubber-modified polymer compositions according to the present invention. Exemplary of such additional monomers are conjugated 1,3 dienes (e.g., butadiene, isoprene, etc.); alpha- or beta-unsaturated monobasic acids and derivatives thereof (e.g., acrylic acid, methylacrylate, ethylacrylate, butylacrylate, methacrylic acid and the corresponding acids thereof, acrylamide, methacrylamide); vinyl halides (e.g., vinyl chloride, vinyl bromide, vinylidene chloride, vinylidene bromide, etc.); vinyl esters (e.g., vinyl acetate, vinyl propionate, etc.); dialkylmaleates or fumarates (e.g., dimethylmaleate, diethylmaleate, dibutylmaleate, the corresponding fumarates, etc.) and ethylenically unsaturated carboxylic acid anhydrides (e.g., maleic anhydride). As is known in the art, the amount of these other comonomers which may be included will vary as the result of various factors. The amount of such comonomers employed will generally be less than about 10 weight percent based on the total weight of the monomers employed in preparing the non-rubber polymeric portions of the rubber-reinforced product.

The various includable monomers can be incorporated into compositions according to the present invention in any or all of several ways. For example, one or more of the additional monomers may be interpolymerized with one or more monovinylidene aromatic monomer(s). One or more of the includable monomers can be graft polymerized onto, and in the case of mass particles occluded within, the rubber particles. In addition, one or more of the includable monomers can be otherwise polymerized into polymeric components which can be combined into rubber-modified polymer compositions according to the present invention.

In one embodiment of the present invention, it has been found that methyl methacrylate can advantageously be included in compositions according to the present invention, in polymerized form, in any or all of the above-described manners in amounts up to about 40 weight percent based on the total weight of the monovinylidene aromatic polymer present therein in matrix, grafted and/or occluded polymer.

It may also be desirable to include in the instant rubber-modified compositions amount of other polymers and/or copolymers such as polycarbonates, polyesterpolycarbonates and polymers and/or copolymers of phenylene oxide.

Any of several well-known polymerization techniques or processes can be employed for polymerizing amounts of graft polymer onto the particles of the improved rubber composition. Preferably one of the mass-type processes is used, such processes including the well-known mass, mass solution, or mass-suspension processes. See, for example U.S. Pat. Nos. 3,509,237; 4,221,883; 4,239,863; and 4,250,271; which are incorporated herein by reference and teach such processes.

In addition, any one of several known polymerization techniques can be employed for polymerizing additional amounts of matrix polymer and/or other graft copolymers, either or both of which can advantageously be combined with portions of the grafted, improved rubber blend composition particles in the present rubber-modified polymer compositions. It should be noted that, as is well known in the art, any production of graft polymer inherently produces amounts of ungrafted (i.e., matrix) polymer, which amounts can be maximized or minimized by the amounts of graftable monomer(s) added. The various suitable polymerization techniques including mass, suspension and emulsion polymerization processes as well as modifications and/or combinations of these processes, are well known in the art. See, for example, U.S. Pat. Nos. 3,509,237; 3,928,494; 4,239,863; 4,243,765; and 4,250,271; which are incorporated herein by reference and teach such processes.

The essence of the present invention, the improved rubber blend composition, preferably for use in mass-type particles, consists essentially of a blend of polybutadiene rubber and a rubbery block copolymer of butadiene with styrene and/or acrylonitrile. The polybutadienes suitable for use in the improved rubber blend compositions of the present invention are well known in the art and include homopolymers of conjugated 1,3-dienes. Such 1,3-dienes have the general formula:

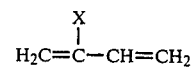

wherein X is selected from the group consisting of hydrogen, chlorine and methyl radicals. Examples of such polybutadienes include the commercially available Diene 35 and Diene 55 brand polybutadienes made by Firestone Synthetic Rubber and Latex Co., polyisoprene and neoprene. Suitable polybutadienes generally have weight average molecular weights in the range of from about 100,000 to about 500,000 and can have some cross-linking. Generally, the polybutadienes have molecular weight distributions as measured by the ratio of the weight average molecular weight to the number average molecular weight (Mw/Mn) of from about 1 to about 8.

The block copolymers suitable for use in the present invention are also well known in the art. The block copolymer can be of the A-B type or it can also be of the so-called triblock type, A-B-A; B being a butadiene polymer and A being styrene and/or acrylonitrile polymers. Such block copolymers comprise 50 to 95 percent butadiene, preferably 65 to 80 percent and most preferably 70 to 75 weight percent butadiene based on weight block copolymer. The balance in each case being styrene and/or acrylonitrile. Usually the block copolymer rubbers have molecular weights and molecular weight distributions in about the same ranges as the polybutadienes suitable for use in the present invention. Examples of such block copolymers include Solprene 308 or Solprene 408 brand rubbers, both of which are commercially available from Phillips Petroleum.

In general, the improved rubber blend compositions according to the present invention consist of from about 10 to about 95 weight percent based on weight improved rubber blend composition of polybutadiene and correspondingly from about 5 to about 90 weight percent of block copolymer. Preferably such blend compositions consist of from about 25 to about 75 weight percent polybutadiene and 25 to 75 weight percent block copolymer, most preferably from about 40 to about 60 weight percent polybutadiene and from about 40 to about 60 weight percent block copolymer.

In the improved rubber blend compositions suitable for preparing improved rubber-modified, impact resistant polymer compositions according to the present invention, the two blended components must be very thoroughly mixed. In order to achieve the requisite mixing it is generally necessary to solution blend the two rubber components by completely dissolving both rubber components in a solvent and mixing the solution to achieve a homogeneous mixture. This solvent can very advantageously consist of or comprise one or more monomer(s) which are desired to be graft polymerized to the rubber blend composition. Such resultant solutions, comprising monomer(s) and dissolved, blended rubbers can then be fed to a reaction vessel, with or without the addition of other reaction ingredients and polymerized. Otherwise, the rubber blend composition can be recovered from solution in the solvent in which it was prepared and re-dissolved and dispersed in a mass polymerization and grafting reaction.

The present invention also involves a particularly advantageous process for the production of rubber-modified, impact-resistant polymer compositions comprising mass particles of the above-described improved rubber blend compositions. This process involves as an improvement to known mass-type polymerization/-grafting reactions the dissolving in the polymerizable monomer solution of the two rubbers which make up the improved rubber compositions, namely a polybutadiene rubber and a block copolymer rubber. The products resulting from the completion of said mass polymerizable process have rubber particles consisting of a blend of the polybutadiene and block copolymer rubbers and have good combinations of gloss and toughness.

The particles of the improved rubber blend composition can be the only rubber present in the rubber-modified polymer composition or such particles can advantageously be used in combination with amounts of other rubber particles, preferably, emulsion produced rubber particles. In general, the rubber-modified polymer compositions according to the present invention comprise from about 5 to about 40 weight percent total rubber based on composition weight, preferably from about 5 to about 30 weight percent.

In general, rubber-modified polymer compositions according to the present invention comprise from about 1 to about 40 weight percent of the improved rubber blend composition based on weight rubber-modified polymer composition. Preferably, polymer compositions according to the present invention comprise from about 5 to about 30 weight percent of the improved rubber blend composition. Generally, the improved rubber blend composition is present in the form of mass particles, having occlusions therein and superstrate grafted thereto, both of monovinylidene aromatic polymer.

In another aspect of the present invention, it has been found that emulsion-produced rubber particles can be very advantageously combined into matrix polymer compositions comprising amounts of the above-described improved rubber composition mass particles. When emulsion rubber particles have been grafted with a non-rubber polymer, but still have a high rubber concentration, at least about 30 weight percent or so, these compositions are very suitable for blending with amounts of compatible rigid matrix polymer, containing amounts of the present, improved rubber composition in the form of mass particles, to achieve desired rubber concentrations in the resultant improved polymeric compositions. Such blendable, grafted emulsion rubber particle intermediates are often referred to as "grafted rubber concentrates" or "GRC's". When such GRC's have a single particle type (size) and are combined into a polymeric composition with mass particles of the above-described improved rubber blend composition, the resultant composition, having a bimodal rubber particle distribution, has a good combination of toughness and gloss. It has also been found that when mass particles of the above-described improved rubber blend composition are combined into polymeric compositions along with a GRC having a bimodal particle size distribution (i.e., the rubber particles of the GRC consisting of two groups of particles, each group having a different average particle size) or two GRC's each GRC containing a group of particles having a different average particle size from the other GRC, the resultant rubber-modified polymeric composition, having a trimodal rubber particle distribution, has a very good combination of toughness and gloss. ABS compositions having such trimodal rubber particle distribution are described and claimed in copending patent application Ser. No. 380,786, entitled "ABS Compositions Having Trimodal Rubber Particle Distributions" by D. E. Henton, which application is incorporated herein by reference. Methods for producing the emulsion particles and GRC's suitable for the uses described herein are well known in the art, including agglomeration techniques which can be used to achieve larger emulsion-produced rubber particles. See, for example, U.S. Pat. Nos. 3,509,237; 3,663,656; and 3,825,621, which is incorporated herein by reference. A particularly advantageous method for agglomerating small emulsion-produced rubber particles is the process taught in U.S. Pat. No. 4,419,496 by Henton et al. which application is incorporated herein by reference.

It has been found that polymer compositions according to the present invention advantageously comprise from about 5 to about 35 weight percent emulsion produced rubber, based on weight rubber modified polymer composition, preferably from about 5 to about 15 weight percent. The emulsion rubber is desirably in the form of a group of particles having a weight average diameter in the range of from about 0.05 to about 5 microns ($\mu$).

In the preferred aspect of the present invention where the emulsion rubber has a bimodal rubber particle distribution, the group of smaller particles generally has a weight average diameter in the range of from about 0.01 to about 0.5$\mu$ while the second group of emulsion particles generally has a weight average diameter greater than that of the first, generally in the range of from about 0.25 to about 5$\mu$. Usually, the small emulsion particle component comprises from about 1 to about 94 weight percent of the total rubber, preferably from about 25 to about 50 weight percent and the second, larger emulsion particle component usually comprises from about 1 to about 80 weight percent, preferably from about 10 to about 40 weight percent of the total rubber, the present improved rubber blend composition comprising the balance.

In general, emulsion rubbers suitable for use in the present invention are well known in the art and include homo- and copolymers of 1,3-conjugated dienes and many other elastomeric materials which can be produced via emulsion polymerization.

The components comprising the mass and emulsion rubbers, as well as additional amounts of matrix polymer if desired, can be combined by mixing processes and techniques generally known in the art, which will suitably admix the two. For example, commercially available mixers such as Banbury mixers or Welding Engineers compounders are suitable.

As will be shown in the following examples, the use of the presently described improved rubber compositions as mass particles in rubber-modified, impact-resistant polymer compositions both by themselves and in combination with emulsion-produced rubber particles surprisingly gives compositions having better combinations of toughness and gloss than similar compositions having mass particles produced from either the polybutadiene rubber or the block copolymer rubber by themselves.

EXAMPLES

EXAMPLES 1-6

In the following examples the reactants are continually charged with the aid of pumps in relative amounts as specified below into an agitated reactor. The liquid feed stream consists of styrene-acrylonitrile, diluent and the specified rubber or rubbers. After a steady state is reached in the polymerization, the resultant polymer is devolatilized and collected. The following Table I indicates the compositions of the polymer compositions produced and gives the physical properties of those polymer compositions. In the following examples, the butadiene homopolymers are "Diene 55" or "Diene 35" brand rubber made by Firestone and the butadiene-styrene block copolymer is "Solprene 308" brand rubber made by Phillips Petroleum.

To obtain molded samples for the various tests, the compositions were injection molded on a 2 ounce Negri-Bossi injection molding machine from a barrel having a temperature of from about 400° to 425° F. into a mold at a temperature of about 80° F. As will be recognized, these molding conditions are quite extreme in terms of low temperatures in order to clearly show the differences in gloss among the different compositions.

Various ASTM (American Society for Testing Materials) test methods are used in the following examples. The notched izod impact strength (Izod) values are determined according to ASTM-256 at 73° F. tensile strength at yield ($T_y$) and percent elongation (%E) are determined according to ASTM D-638 at 0.2 in/min. Gloss values are determined according to ASTM D-523. Melt flow rates are determined according to ASTM- D-1238 under condition I.

TABLE I

| | Effect of Type of Rubber on ABS Product Properties | | | | | | |
|---|---|---|---|---|---|---|---|
| | Feed Composition (Weight %) | % Rubber[1] | $T_y$[2] | Izod[3] | % E[4] | Gloss[5] | MFR[6] |
| Example 1* | Styrene = 46.3<br>AN = 19.5<br>Soloprene 308 = 11<br>Diluent = 23.2 | 16.2 | 5900 | 3.95 | 9 | 37 | 2.4 |
| Example 2* | Styrene = 46.4<br>AN = 20<br>Diene 55 = 11.2<br>Diluent = 22.6 | 16.0 | 6160 | 3.66 | 27 | 21 | 2.6 |
| Example 3 | Styrene = 46.5<br>AN = 19.2<br>Diene 55 = 5.9<br>Soloprene 308 = 5.9<br>Diluent = 22.5 | 16.3 | 6450 | 4.95 | 24 | 46 | 2.4 |
| Example 4* | Styrene = 53.4<br>AN = 22.9<br>Soloprene 308 = 4.6<br>Diluent = 19.2 | 6.5 | 7850 | 0.95 | 10 | 57 | 3.1 |
| Example 5* | Styrene = 53.4<br>AN = 22.9<br>Diene 55 = 4.6<br>Diluent = 19.1 | 6.6 | 7350 | 1.2 | 21 | 38 | 3.2 |
| Example 6 | Styrene = 53.4<br>AN = 22.9<br>Diene 55 = 2.3<br>Soloprene 308 = 2.3<br>Diluent = 19.1 | 6.3 | 7750 | 1.38 | 29 | 68 | 2.9 |
| Example 7* | Styrene = 47.8<br>AN = 21<br>Diene 35 = 8<br>Diluent = 23.2 | 12 | 6263 | 2.56 | 7.4 | 41 | 3.1 |
| Example 8 | Styrene = 47.8<br>AN = 21<br>Diene 35 = 6<br>Soloprene 308 = 2<br>Diluent = 23.2 | 12 | 6460 | 4.12 | 17.2 | 60 | 3.3 | notes:
*Indicates comparative examples, not an example of the present invention.
[1]Weight percent of rubber in the ABS product.
[2]Tensile strength at yield in pounds per square inch.
[3]Notched Izod impact strength in foot pounds per inch notch.
[4]Percent elongation.
[5]Gardner gloss taken at 60°, in percent.
[6]Melt flow rate in grams per 10 minutes.

EXAMPLES 9-15

These examples show the benefits achieved when rubber-modified polymer compositions prepared according to the present invention comprise, in addition to mass particles of the improved rubber blend composition, groups of grafted emulsion rubber particles (GRC's). The mass resins with which the GRC's are combined are those produced in Examples 4-8.

Emulsion resin A was prepared by the emulsion polymerization of the rubber in an aqueous latex to produce particles having a weight average diameter of 0.1 micron. Emulsion resin B was prepared by taking a portion of emulsion resin A and partially agglomerating the particles thereof to achieve a bimodal particle size distribution in the GRC with about 60 percent of the rubber particles having the original diameter of 0.1 micron and 40 percent of the rubber particles having diameter of about 1 micron. Emulsion resins A and B were then grafted with a styrene-acrylonitrile polymer to achieve about 50 percent rubber in the product. In the following examples, the pellets of the mass-produced polymer composition and the dry powdery emulsion-produced resin are mixed in a Banbury Mixer for three minutes at a temperature of approximately 180° C. then injection molded on a Negri-Bossi machine. The following Table II shows the emulsion resins and the mass resins and the amounts of each that are blended together to produce a resultant ABS product, the percent rubber in such ABS product and what percentage of that rubber is mass rubber. The properties of the resultant ABS compositions are then shown.

TABLE II

Blends of Mass Resins with Emulsion GRC's

| | Blend Composition | | | | Blend Properties | | | | |
|---|---|---|---|---|---|---|---|---|---|
| Example Number | Emulsion Resin[7] | Mass Resin[8] | % Rubber[1] | % Mass Rubber[9] | MFR[6] | Ty[2] | % E[4] | Izod[3] | Gloss[5] |
| 9 | 23% - A | 77% - Ex. 6 | 16.0 | 30 | 1.8 | 6623 | 27 | 2.2 | 87 |
| 10 | 25% - B | 75% - Ex. 6 | 16.1 | 29 | 2.0 | 6671 | 35 | 4.4 | 88 |
| 11* | 25% - B | 75% - Ex. 4 | 16.3 | 30 | 2.2 | 6575 | 21 | 3.7 | 68 |
| 12* | 25% - B | 75% - Ex. 5 | 16.3 | 30 | 2.3 | 5560 | 29 | 3.9 | 62 |
| 13 | 16% - A | 84% - Ex. 6 | 13.1 | 40 | 2.2 | 6750 | 18 | 2.1 | 88 |
| 14 | 17% - B | 83% - Ex. 6 | 13.0 | 40 | 2.3 | 6856 | 34 | 3.8 | 86 |
| 15* | 17% - B | 83% - Ex. 4 | 13.1 | 40 | 2.2 | 6580 | 22 | 2.6 | 74 |
| 16* | 17% - B | 83% - Ex. 5 | 13.2 | 41 | 2.4 | 6340 | 29 | 2.5 | 66 |
| 17* | 10% - B | 90% - Ex. 7 | 15.8 | 68 | 2.4 | 5662 | 24 | 3.4 | 45 |
| 18 | 10% - B | 90% - Ex. 8 | 15.8 | 68 | 2.6 | 5981 | 30 | 4.8 | 66 |

*Indicates comparative examples, not an example of the present invention.
[1] Weight percent of rubber in the ABS product.
[2] Tensile strength at yield in pounds per square inch.
[3] Notched Izod impact strength in foot pounds per inch notch.
[4] Percent elongation.
[5] Gardner gloss taken at 60°, in percent.
[6] Melt flow rate in grams per 10 minutes.
[7] The weight percent of the total composition which the emulsion resin (GRC) makes up, the resin being identified above.
[8] The weight percent of the composition which the mass resin makes up, the resin being produced in the indicated example from Table I, above.
[9] The percentage of the total rubber in the ABS which the mass rubber makes up.

As is apparent from the foregoing specification, including the above examples, the present invention is susceptible of being embodied with various alterations and modifications which may differ particularly from those that have been described above. For this reason, it is to be fully understood that all of the foregoing is intended to be merely illustrative and is not to be construed or interpreted as being restrictive or otherwise limiting of the present invention excepting as it is set forth and defined in the hereto appended claims.

What is claimed is:

1. An improved rubber-modified impact resistant monovinylidene aromatic polymer composition having dispersed therein:
  I. from about 1 to about 40 weight percent based on weight polymer composition of an improved rubber composition consisting of a blend of:
   (a) from about 10 to about 95 weight percent based on weight improved rubber composition of polybutadiene; and
   (b) from about 5 to about 90 weight percent based on weight improved rubber composition of block copolymer of butadiene with monovinylidene aomatic monomer and/or ethylenically unsaturated nitrile monomer;
   the improved rubber composition being in the form of discrete particles having occluded therein and grafted thereto amounts of monovinylidene aromatic polymer; and
  II. from about 5 to about 35 weight percent based on weight polymer composition of emulsion produced rubber in the form of particles, said particles having a bimodal size distribution, with the further limitation that the improved rubber-modified, impact-resistant monovinylidene aromatic polymer composition comprises from about 5 to about 40 weight percent total rubber based on weight polymer composition.

2. A composition according to claim 1 wherein the monovinylidene aromatic polymer comprises polymerized therein from about 5 to about 50 weight percent based on the weight monovinylidene aromatic polymer of an ethylenically unsaturated nitrile monomer.

3. A composition according to claim 1 comprising from about 5 to about 15 weight percent emulsion produced rubber.

4. A composition according to claim 3 comprising from about 5 to about 30 weight percent improved rubber blend composition.

5. A composition according to claim 1 wherein a group of smaller emulsion particles has a weight average diameter in the range of from about 0.01 to about 0.5μ while the second group of emulsion particles has a weight average diameter greater than that of the first, in the range of from about 0.25 to about 5μ.

6. A composition according to claim 5 wherein the small emulsion particle component comprises from about 1 to about 94 weight percent of the total rubber and the larger emulsion particle component comprises from about 1 to about 80 weight percent of the total rubber.

* * * * *